(No Model.)
M. W. CHAMBERLAIN.
MACHINE FOR EXPANDING CAN COVERS.
No. 433,271. Patented July 29, 1890.
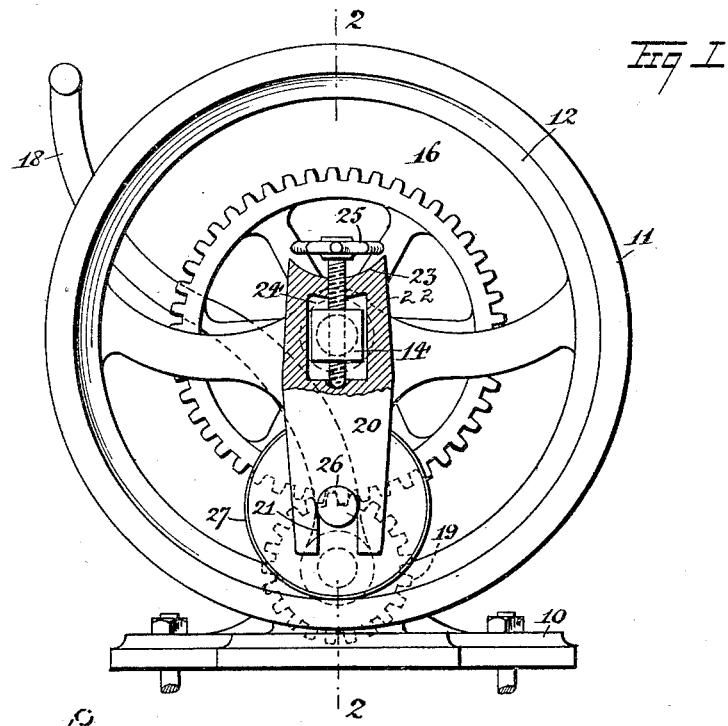
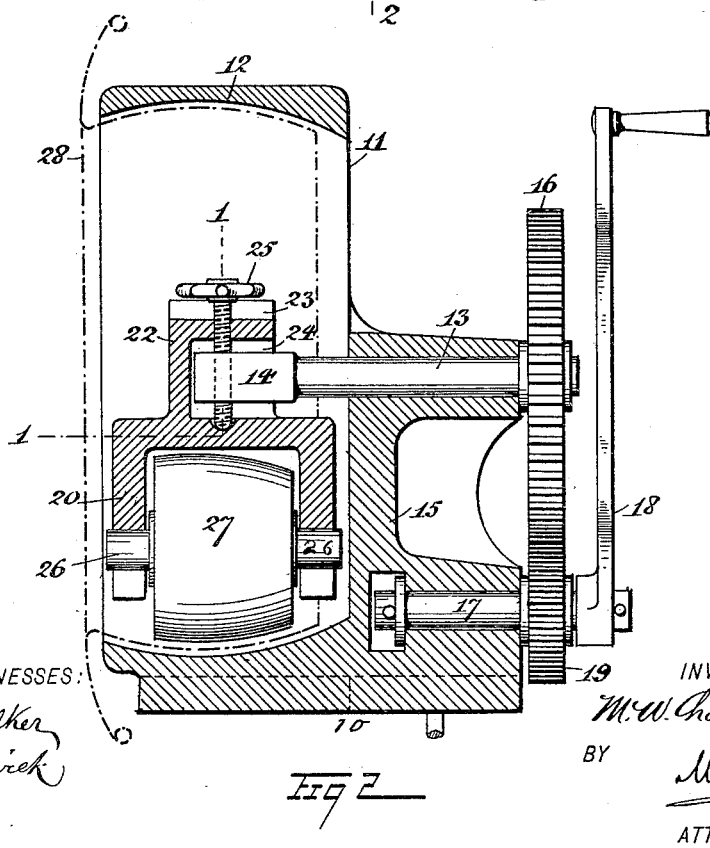
WITNESSES:
H. Walker
C. Sedgwick
INVENTOR:
M. W. Chamberlain
BY Munn & Co.
ATTORNEYS

UNITED STATES PATENT OFFICE.

MARCUS W. CHAMBERLAIN, OF HACKETTSTOWN, NEW JERSEY.

MACHINE FOR EXPANDING CAN-COVERS.

SPECIFICATION forming part of Letters Patent No. 433,271, dated July 29, 1890.

Application filed December 3, 1889. Serial No. 332,368. (No model.)

*To all whom it may concern:*

Be it known that I, MARCUS W. CHAMBERLAIN, of Hackettstown, in the county of Warren and State of New Jersey, have invented a new and Improved Machine for Expanding Can-Covers, of which the following is a full, clear, and exact description.

My invention relates to an improved machine for expanding can-covers and other similar articles, and has for its object specially to produce a machine upon which the flanges of can-covers crimped or battered by constant use to such an extent that they are rendered unfit for service may be expeditiously and conveniently expanded to their original shape.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in both the views.

Figure 1 is a front elevation of the machine partially in section, the section being taken on line 1 1 of Fig. 2, and Fig. 2 is a vertical section on line 2 2 of Fig. 1.

The body of the machine consists of a base 10, which may be attached to any suitable support in any approved manner, and a hollow cylinder 11, integral with or secured to the base, the inner wall of which cylinder is made concaved or depressed at its center portion, as best shown at 12 in Fig. 2. The ends of the cylinder are open, and from the rear of the cylinder a shaft 13 is projected therein, the inner end of which shaft is essentially rectangular, as illustrated at 14 in Fig. 2, the outer end of the shaft being journaled in a suitable post or standard 15, projected upward from the base.

Upon the outer end of the shaft 13 a spur-wheel 16 is rigidly secured. This shaft 13 is driven from a shorter shaft 17, journaled in the base, the said lower shaft being provided at its outer extremity with a crank 18 and a pinion 19, which pinion meshes with the spur-gear 16.

Within the cylinder 12 a forked bearing or yoke 20 is located, the members of which yoke or bearing at their lower extremities are recessed, as best shown at 21 in Fig. 1, and the said yoke or bearing is adjustably attached to the rectangular extremity of the upper shaft 13 in the following manner: About the center of the upper surface of the yoke or bearing 20 a boss or extension 22 is formed, preferably provided with an upper concave surface 23 and a rectangular recess 24 in its rear side, into which recess the rectangular extremity of the shaft 13 is introduced. The forked yoke or bearing is rendered adjustable upon the shaft by a set-screw 25, which passes through the boss or extension 22 and engages the rectangular extremity of the shaft 13 and enters preferably a concavity formed in the upper surface of the yoke.

It will be observed that the recess 24 in the yoke-extension 22 is sufficiently large to permit a ready adjustment of the yoke or bearing upon the shaft 13, yet the said yoke or bearing is prevented from turning upon the shaft and compelled to turn therewith.

The recessed extremities of the members of the yoke or bearing 20 are made to receive the trunnions 26 of a pressure or forming roller 27, which roller is held to turn within the yoke or bearing between the members thereof. This shaping or forming roller 27 is provided with a convex peripheral surface. In fact, the peripheral surface of the roller is formed to fit the interior concave surface of the cylinder over which it rolls.

In operation a can-cover 28, having its flange battered, crimped, or otherwise so marred as to render it comparatively unfit for use, is placed in the machine in such a manner that the flange of the cover will enter the interior of the cylinder. The roller 27 is then adjusted to bear upon the inner face of the flange and the crank-arm 18 is turned or the shaft 13 is driven in any other approved manner, whereby the yoke and roller 27 are made to turn with the shaft and roll the flange of the cover smooth and convex the outer face of said flange at its center.

I desire it to be understood that while specific construction has been shown and described, other equivalent construction may be employed without departing from the spirit of the invention.

Having thus described my invention, I claim as new and desire to secure by Letters Patent—

1. In a machine for expanding can-covers, the combination, with the stationary cylinder open at its front end for the insertion and removal of the article, of a concentric shaft extending into the cylinder from the rear and provided at its inner end with a shaping-roller, substantially as set forth.

2. In a machine for expanding can-covers, the combination, with the stationary cylinder open at its front end for the insertion and removal of the article, of a concentric shaft extending into the cylinder through its rear end and provided with driving mechanism exterior to the cylinder, a yoke on the inner end of the shaft at right angles thereto and adjustable toward and from the internal working-surface of the cylinder, and a roller journaled in the outer end of the yoke-arms parallel with said shaft, substantially as set forth.

3. In a machine for expanding can-covers and similar articles, the combination, with a hollow cylinder having a concave inner face and a drive-shaft provided with one squared extremity extending within the cylinder, of a yoke or bearing-fork provided with an extension upon its upper surface having a recess in one face to receive the squared end of the shaft, a set-screw passing through the said extension and the said squared end of the shaft, and a shaping-roller journaled in the members of the fork or yoke, the peripheral surface of which roller conforms to the inner contour of the cylinder, substantially as and for the purpose specified.

4. In a machine for expanding can-covers and similar articles, the combination, with a base provided with a standard, a hollow cylinder secured upon the said base, a shaft journaled in the upper end of the standard having one end squared and projected within the cylinder and a spur-wheel secured upon its opposite end, and a lower shaft provided with a pinion and a crank-arm, the pinion being adapted to mesh with the spur-wheel of the upper shaft, of a forked bearing or yoke provided with an extension upon its upper face having a recess in one side to receive the squared end of the upper shaft, a set-screw passing through the said extension and the said squared end of the shaft, and a shaping-roller journaled in the members of the said fork or yoke, the peripheral surface of which roller corresponds to the concave inner face of the cylinder, substantially as and for the purpose specified.

MARCUS W. CHAMBERLAIN.

Witnesses:
R. Q. BOWERS,
M. B. BOWERS, Jr.